US012031084B2

(12) United States Patent
Luhrs

(10) Patent No.: US 12,031,084 B2
(45) Date of Patent: Jul. 9, 2024

(54) PHASE CHANGE MATERIALS COMPOSITE FORMULATIONS

(71) Applicant: The United States of America, as represented by the Secretary of the Navy, Arlington, VA (US)

(72) Inventor: Claudia Catalina Luhrs, Pacific Grove, CA (US)

(73) Assignee: The Government of the United States of America, represented by the Secretary of the Navy, Washington, DC (US)

( * ) Notice: Subject to any disclaimer, the term of this patent is extended or adjusted under 35 U.S.C. 154(b) by 0 days.

(21) Appl. No.: 16/937,495

(22) Filed: Jul. 23, 2020

(65) Prior Publication Data

US 2021/0024801 A1    Jan. 28, 2021

Related U.S. Application Data

(60) Provisional application No. 62/877,743, filed on Jul. 23, 2019.

(51) Int. Cl.
| | |
|---|---|
| *C09K 5/06* | (2006.01) |
| *C09K 5/02* | (2006.01) |
| *C08K 3/04* | (2006.01) |
| *C08K 3/38* | (2006.01) |
| *C08K 5/01* | (2006.01) |
| *C08K 13/02* | (2006.01) |
| *C08L 61/00* | (2006.01) |
| *C08L 61/28* | (2006.01) |
| *C08L 79/08* | (2006.01) |

(52) U.S. Cl.
CPC .............. *C09K 5/063* (2013.01); *C09K 5/02* (2013.01); *C09K 5/06* (2013.01); *C08K 3/04* (2013.01); *C08K 3/38* (2013.01); *C08K 5/01* (2013.01); *C08K 13/02* (2013.01); *C08L 61/00* (2013.01); *C08L 61/28* (2013.01); *C08L 79/08* (2013.01)

(58) Field of Classification Search
CPC .. C09K 5/063; C09K 5/06; C09K 5/02; C08L 79/08; C08L 61/28; C08L 61/00; C08K 3/38; C08K 3/2003; C08K 3/385; C08K 3/04; C08K 3/041; C08K 3/042; C08K 5/01; C08K 13/02
See application file for complete search history.

(56) References Cited

U.S. PATENT DOCUMENTS

| | | | | |
|---|---|---|---|---|
| 6,207,738 | B1 * | 3/2001 | Zuckerman | D04H 11/00 524/475 |
| 6,632,523 | B1 * | 10/2003 | Rosenfeld | C08L 79/08 528/21 |
| 2003/0220432 | A1 * | 11/2003 | Miller | C08K 3/38 524/495 |
| 2008/0233368 | A1 * | 9/2008 | Hartmann | D06M 23/12 428/206 |
| 2010/0200801 | A1 * | 8/2010 | Ramasamy | C08K 3/38 252/74 |
| 2013/0238065 | A1 * | 9/2013 | Rao | A61P 17/00 424/722 |
| 2016/0230007 | A1 * | 8/2016 | Johnson | A63B 71/085 |
| 2019/0085225 | A1 * | 3/2019 | Zhang | H01L 23/3675 |
| 2019/0237224 | A1 * | 8/2019 | Heinemann | H01C 17/06586 |

FOREIGN PATENT DOCUMENTS

| | | | | |
|---|---|---|---|---|
| CN | 106118608 A | * | 11/2016 | ............. C09K 5/063 |
| DE | 102017113884 A1 | * | 12/2017 | ............. H01C 7/02 |
| WO | WO 2009/138990 A1 | * | 11/2009 | ............. C09K 5/00 |
| WO | WO 2017/152353 A1 | * | 9/2017 | ............. C09K 5/00 |

OTHER PUBLICATIONS

Acrysol (TM) ASE-60 technical data sheet from Rohm and Haas, published Aug. 2003 (Year: 2003).*
Machine translation of CN 106118608 A to MA et al., published Nov. 16, 2016 (Year: 2016).*
Arce et al., Novel Formulations of Phase Change Materials—Epoxy Composites for Thermal Energy Storage, Materials 2018, 11(2), Jan. 26, 2018.
Yavari et al., Enhanced Thermal Conductivity in a Nanostructured Phase Change Composite due to Low Concentration Graphene Additives, J. Phys. Chem. C 2011, 115, 17, 8753-8758, Apr. 11, 2011.

* cited by examiner

*Primary Examiner* — Jane L Stanley
(74) *Attorney, Agent, or Firm* — Naval Postgraduate School; Scott Bell

(57) ABSTRACT

The invention relates to a polymeric composite. The polymeric composite includes a polymeric matrix that further includes a thermoset polymer and a phase change material that has been mixed with the polymeric matrix using a thickening agent. In some cases, the polymeric composite is at least 10% by weight of the phase change material.

5 Claims, 2 Drawing Sheets

PHASE CHANGE MATERIALS COMPOSITE FORMULATIONS

RELATION TO OTHER APPLICATIONS

This application claims priority to and the benefit of U.S. Application No. 62/877,743 filed Jul. 23, 2019, which is hereby incorporated in its entirety by reference.

FIELD OF THE INVENTION

The present invention is directed to composite materials that are capable of regulating the temperature of living or storage spaces.

BACKGROUND

Due to the rapid industrial growth and ever-increasing energy demands, there is an urgent need for the utilization of renewable energy sources for sustainable and environmentally friendly development. Increasing demands for thermal comfort have led to the higher energy consumption of heating, ventilation, and air conditioning (HVAC) systems. Energy saving for such purposes can be attained by the use of thermal energy storage (TES) systems, where the excess thermal energy can be stored to bridge the gap between the energy demands and generation. For instance, solar thermal energy can be stored during day hours and utilized during off-peak hours/night times with the use of TES systems, which are of particular interest for adaptable systems such as removable attachment/liners for portable accommodations or spaces. TES can be subdivided into sensible heat storage (SHS), latent heat storage (LHS), and thermochemical categories. While SHS is the most commonly used method, LHS is considered very promising due to the wide range of available phase change materials (PCMs) with higher thermal storage density, and almost isothermal operation during thermal release and absorption.

PCMs are substances that absorb/release thermal energy during a phase transformation, which is typically melting/solidification, and can be categorized into organic, inorganic, and eutectics. Among organic PCMs, paraffins or alkanes with a chemical formula of $C_nH_{2n+2}$ (n=12-50) have been widely investigated due to their chemical stability, high latent heat of fusion, low cost, compatibility with metal containers, and non-corrosive nature. Despite the aforementioned advantages of paraffins, one of their major disadvantages is their low thermal conductivity, which can significantly interfere with their charging/discharging rates. To address the low thermal conductivity of the paraffins, the addition of thermally conducting agents to form paraffin composites has been widely explored.

SUMMARY

Embodiments in accordance with the invention relate a polymeric composite. The polymeric composite includes a polymeric matrix that further includes a thermoset polymer and a phase change material that has been mixed with the polymeric matrix using a thickening agent. In some cases, the polymeric composite is at least 10% by weight of the phase change material.

Embodiments in accordance with the invention are further described herein with reference to the drawings.

DETAILED DESCRIPTION

For illustrative purposes, the principles of the present disclosure are described by referencing various exemplary embodiments. Although certain embodiments are specifically described herein, one of ordinary skill in the art will readily recognize that the same principles are applicable to, and can be employed in other systems and methods.

Before explaining the disclosed embodiments of the present disclosure in detail, it is to be understood that the disclosure is not limited in its application to the details of any particular embodiment shown. Additionally, the terminology used herein is for the purpose of description and not of limitation. Furthermore, although certain methods are described with reference to steps that are presented herein in a certain order, in many instances, these steps may be performed in different order as may be appreciated by one skilled in the art; the method embodiments described are therefore not limited to the particular arrangement of steps disclosed herein.

It is be noted that as used herein and in the appended claims, the singular forms "a", "an", and "the" include plural references unless the context clearly dictates otherwise. Furthermore, the terms "a" (or "an"), "one or more" and "at least one" can be used interchangeably herein. The terms "comprising", "including", "having" and "constructed from" can also be used interchangeably.

In embodiments of the invention, two different organic PCMs, n-nonadecane ($C_{19}H_{40}$, abbreviated as C19 henceforth) and n-eicosane ($C_{20}H_{42}$, abbreviated as C20 henceforth) are considered. The choice of PCMs stemmed from their activity being close to summer temperatures (30-45° C.). To mitigate paraffin leakage, a thermoset polymer (e.g., epoxy resin) can be incorporated as the support matrix material. A thickening agent, such as carbopol, can be added to the epoxy-PCM formulations to minimize phase separation during sample synthesis. Nanostructured carbons including carbon nanofibers (CNF), carbon nanotubes (CNT), BN particles, boron nitride, and boron nitride nanotubes can be added as thermally conductive fillers in different gravimetric ratios to achieve different thermophysical properties. The formulations can use three-dimensional (3D) printed and vibration-assisted printing (VAP) successfully, thereby demonstrating the feasibility of the direct material integration onto liners/containers for TES applications.

Figure 1:
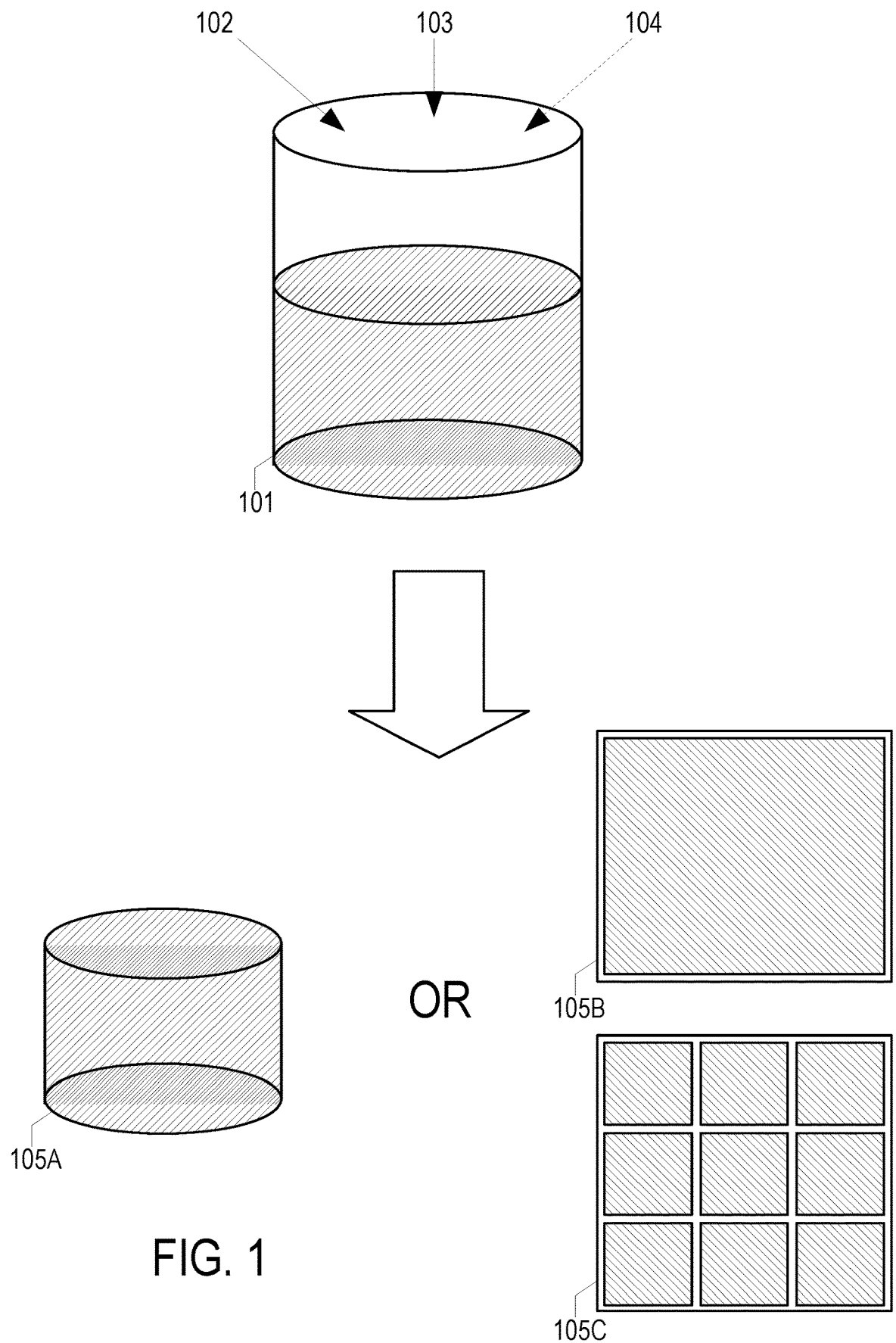
FIG. 1 shows a technique for creating a phase change material polymeric composite.

FIG. 1 shows a technique for creating a phase change material (PCM) polymeric composite. As is the case with this and other workflows described herein, various embodiments may not include all of the steps described below, may include additional steps, and may sequence the steps differently. Accordingly, the specific arrangement of steps shown in FIG. 1 should not be construed as limiting the scope of creating a phase change material polymeric composite.

Initially, a thickening agent 102 (e.g., Carbopol) is incorporated into a polymeric matrix 101 to create a polymeric mixture. The thickening agent 102 can be incorporated while the polymeric matrix 101 is in a liquid state. The polymeric matrix 101 includes a thermoset polymer. Examples of thermoset polymers include vinyl esters, cyanate esters, polyimides, melamine resins, and phenolic resins.

In a more specific example, the polymeric matrix 101 selected is Epofix, which is a cold-setting resin based on two fluid epoxy components: (1) a first component containing bisphenol-A diglycidylether, and (2) a second component containing triethylenetetramine, which functions as the hardener. The selection of the epoxy resin stemmed from the low viscosity and linear shrinkage expected of Epofix, since the preferred method to deposit the composite formulations would be a gel 3D printing system. Epofix cures in 8 to 24 hours, has a viscosity of 550 cP (at 20° C.) and 150 cP (at 50° C.), and is resistant to acids, bases, acetone, and alcohol.

In some embodiments, carbopol, a cross-linked polyacrylic acid polymer, is selected as the thickening agent 102 due to its known ability to stabilize and suspend pharmaceutical products.

Next a PCM 103 is added to the polymeric mixture. The PCM 103 that changes phases at temperatures between 25-45° C. Examples of PCM's include but are not limited to nonadecane (melting point (MP) 32-33° C., icosane (MP 36.7° C.), henicosane (MP 40.5° C.), docosane (MP 42° C.), and eicosane (MP 35-37° C.). The thickening agent 102 ensures that the PCM 103 is well incorporated into the polymeric mixture. Specifically, the thickening agent 102 allows the PCM 103 to have up to a 40% weight percentage in the polymeric mixture.

The thermal characteristics of samples prepared with various PCM's 103 were evaluated. For example, differential scanning calorimetry thermograms of n-nonadecane (C19) and n-eicosane (C20) showed transition/peak temperatures at 32.9° C. and 42.1° C., and the corresponding latent heats were estimated as 160.2 $J \cdot g^{-1}$ and 179.8 $J \cdot g^{-1}$ for nonadecane and eicosane, respectively. The endothermic onset temperatures were noted as 29.7° C. and 35.2° C. for C19 and C20, respectively. Despite the higher latent heat exhibited by eicosane, nonadecane was selected for further sample formulations owing to the proximity of its activity to ambient temperatures, which makes it more suitable for thermal regulation applications. DSC thermograms of nonadecane, bare epoxy (cured Epofix resin), and EC-PCM40 samples were also considered. No endothermic or exothermic peaks were observed for the bare epoxy sample. The EC-PCM40 sample, on the other hand, exhibited two endothermic peaks-a small peak at 31.4° C. and a larger peak at 34.4° C.; the small peak could be a result of a solid-solid transition, whereas the pronounced peak is ascribed to the solid-liquid transition of the paraffin.

Epoxy-carbopol-PCM formulations with nanostructured carbon fillers 104 and BN fillers 104 were also considered. An enhancement in the latent heat is noted with the addition of CNF and CNT, as compared to the EC-PCM40 sample. The improvement in the latent heat is ascribed to the intermolecular attraction between the nanostructured carbon and the paraffin. Studies found that higher latent heat was observed for CNT/wax relative to CNF/wax, and the enhancement was attributed to the higher molecular density and the larger surface area of CNTs compared to the CNFs.

Similar to nanostructured carbon additives, BN-based epoxy-carbopol-PCM formulations also showed an increase in the latent heat with increasing BN content. The composite with 1 wt. % BNNT exhibited the highest latent heat among BN-based composites. However, the BNNTs in the EC-PCM40-BNNT01 sample aggregated and were hard to disperse homogeneously. Despite the higher latent heat exhibited by 1 wt. % CNT and 20 wt. % BN compositions relative to the 10 wt. % BN sample, the latter was chosen for 3D printing purposes due to the highly viscous nature of the pre-cured 1 wt. % CNT and 20 wt. % BN compositions.

In some cases, the polymeric mixture can also include a filler 104 for increasing the thermal conductivity of the mixture. Examples of thermal enhancers include but are not limited to boron nitride particulates, boron nitride tubes (at the micron or nano scales), or carbon phases such as fibers, tubes or two dimensional structures (e.g., carbon micron/nano fibers, carbon nanotubes, or graphene).

Enhancement in latent heat, thermal conductivity, and heat transfer can be achieved with the addition of the thermal fillers 104. In addition to the improved thermophysical properties, the epoxy-carbopol-PCM composition with 10 wt. % boron nitride showed excellent reversibility upon extended heating-cooling cycles. Furthermore, the formulations with thermal fillers 104 were successfully extruded/casted for 3D printing purposes, thereby demonstrating the feasibility of the direct integration of the material onto removable liners or portable containers for thermal regulation applications. Given that the PCMs 103 solidify in exothermic conditions, the liners can be removed when the temperatures drop below the transition temperatures. Depending on the environment and temperatures, the presented method can be extended to other PCMs for TES purposes.

After the PCM 103 is added, the polymeric mixture can be either solidified or cured to create a PCM polymeric composite 105A, 105B, 105C. For example, the polymeric mixture can be cured in a container to create a solid polymeric composite 105A in the shape of the container. In another example, a surface, fabric, or liner can be coated with the polymeric mixture and then solidified to create coated polymeric composite 105B or a strategically coated polymeric composite 105C. In this example, the specimens 105B, 105C can be covered by a very thin layer of the polymeric mixture (either by 'dipping' or by other surface application methods) to prevent PCM leakage.

The application envisioned for these PCM polymeric composites 105A, 105B, 105C is the regulation of temperature in environments commonly used by humans and/or those employed as storage (e.g., storage of electronic equipment). In an example of use the composite 105A, 105B, 105C could be deposited and cured/solidified in a removable liner (textile) by the use of templates or 3D printing techniques.

Figure 2:
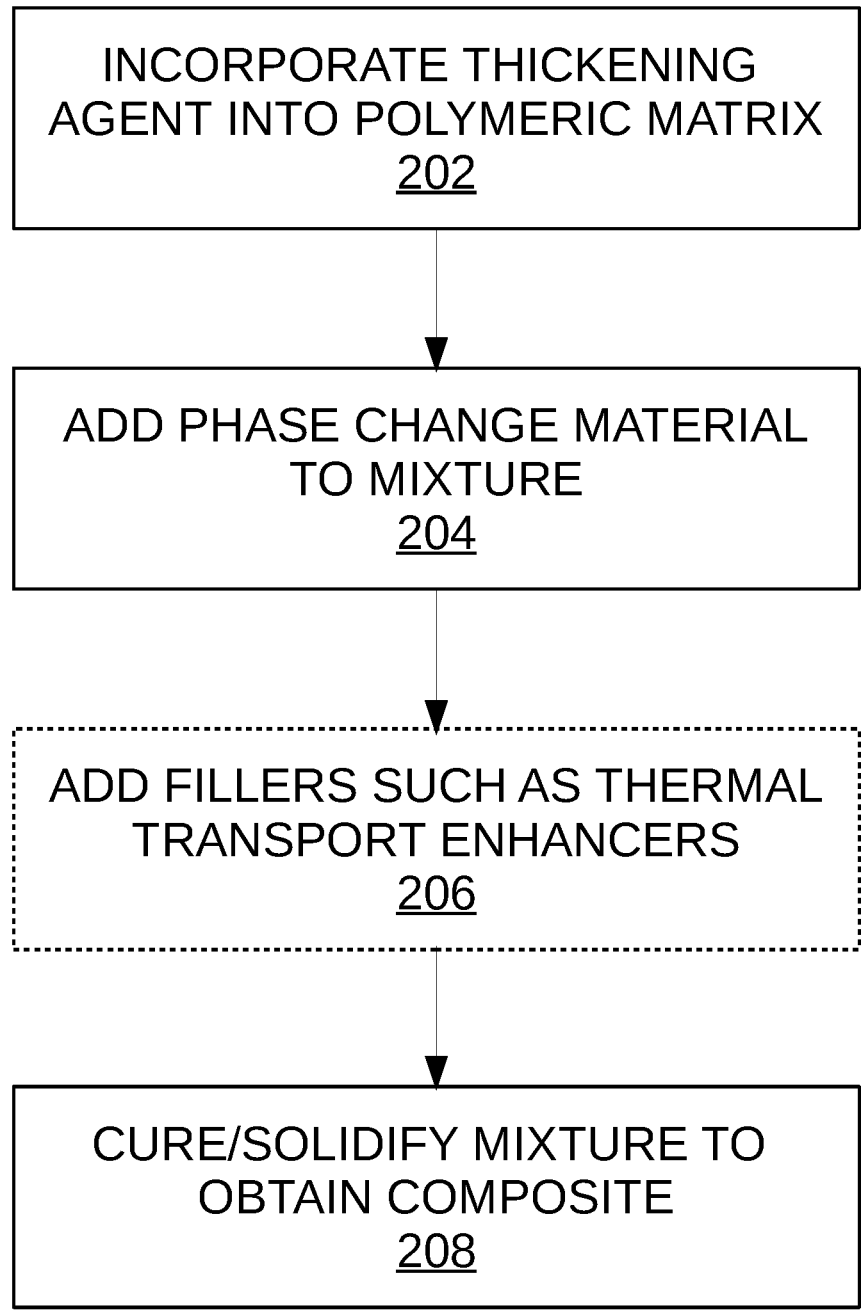
FIG. 2 shows an example workflow for creating a phase change material polymeric composite.

FIG. 2 shows an example workflow for creating a PCM polymeric composite. In step 202, a thickening agent is incorporated into a polymeric matrix. In step 204, phase change material is added to the polymeric matrix. For example, the phase change material can be melted using a water bath and then mixed into the polymeric matrix using a dual asymmetric speed mixer. Optionally, in step 206, fillers such as thermal transport enhancers can be added to the polymeric matrix.

In step 208, the polymeric matrix can be cured or solidified to create the polymeric composite. For example, the polymeric matrix can be left to cure at room temperature in flexiform molds. In another example, the polymeric mixture can be 3D printed using vibration-assisted printing (VAP). VAP uses resonant nozzle vibrations in a direct-write system to reduce effective friction at the nozzle exit, and it has been used for dispensing highly viscous mixtures with high solids loadings reaching 76 volume percentage. The vibrations increase the temperature at the nozzle to a range of 28 to 32° C., which locally melts the PCM and acts synergistically with the friction reduction to induce flow in a controlled manner.

The previously described versions of the present invention have many advantages, including but not limited to those described above. However, the invention does not require that all advantages and aspects be incorporated into every embodiment of the present invention.

All publications and patent documents cited in this application are incorporated by reference in their entirety for all purposes to the same extent as if each individual publication or patent document were so individually denoted.

What is claimed is:

1. A polymeric composite comprising:
    a polymeric matrix that includes a first epoxy compound that includes bisphenol-A diglycidylether and a second epoxy compound that includes triethylenetetramine;
    a phase change material that has been mixed with the polymeric matrix using a cross-linked polyacrylic acid polymer, and
    a layer of a thermoset polymer to prevent the phase change material from leaking,
    wherein the phase change material is at least 10% by weight of the polymeric composite.

2. The polymeric composite of claim 1, further comprising a thermal enhancer to increase thermal conductivity of the polymeric composite.

3. The polymeric composite of claim 2, wherein the thermal enhancer is selected from the group consisting of boron nitride particulates, boron nitride nanotubes, carbon micro-fibers, carbon nanofibers, carbon nanotubes, and graphene.

4. The polymeric composite of claim 1, wherein the phase change material is selected from the group consisting of nonadecane, icosane, heneicosane, and docosane.

5. The polymeric composite of claim 1, wherein the phase change material is at least 40% by weight of the polymeric composite.

* * * * *